Oct. 31, 1950      I. I. MERKUR      2,527,952
FILM SPLICER
Filed July 25, 1946      4 Sheets-Sheet 1
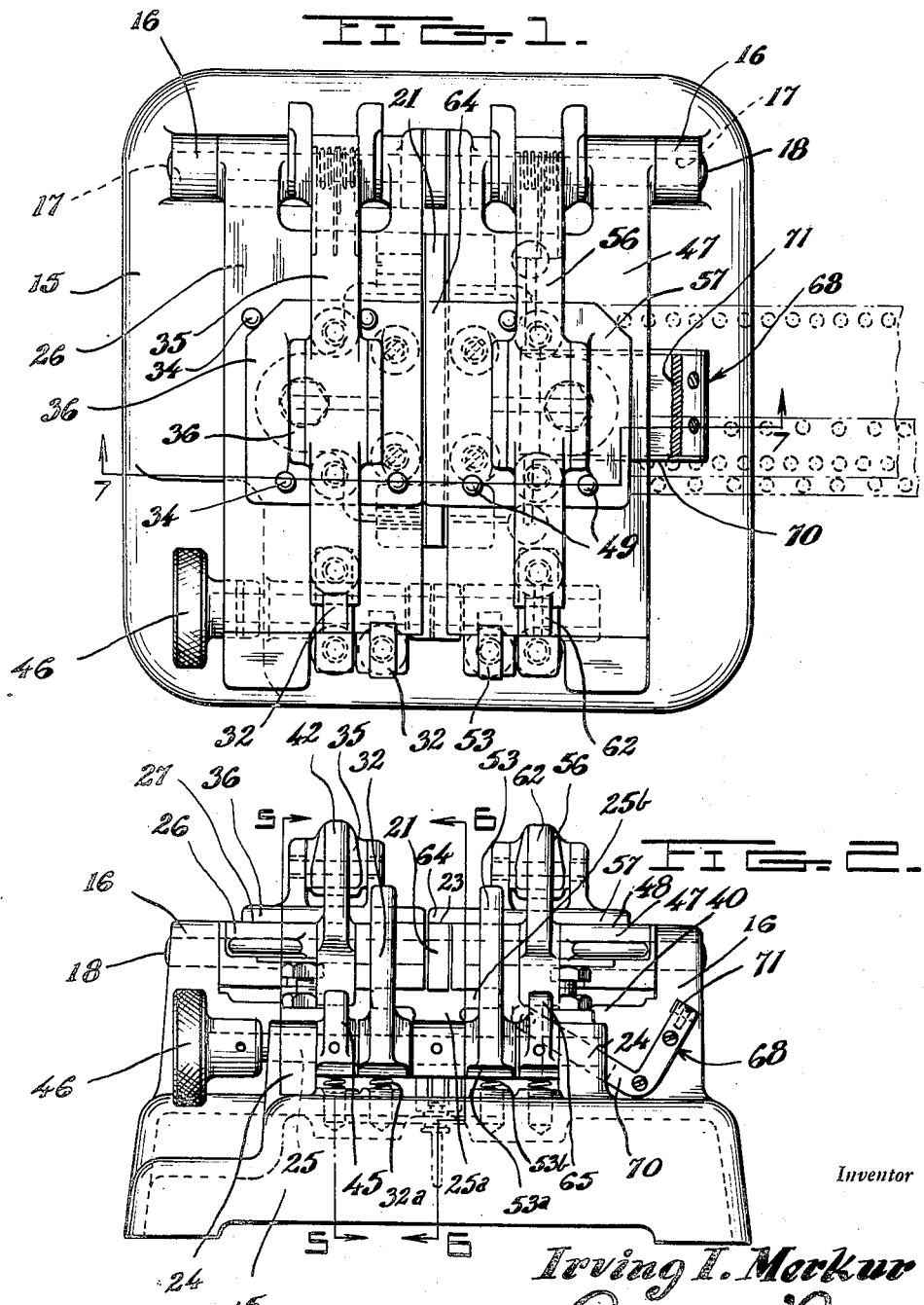
Inventor
Irving I. Merkur
By Clarence A. O'Brien
and Harvey B. Jacobson
Attorneys Oct. 31, 1950  I. I. MERKUR  2,527,952
FILM SPLICER
Filed July 25, 1946  4 Sheets-Sheet 2
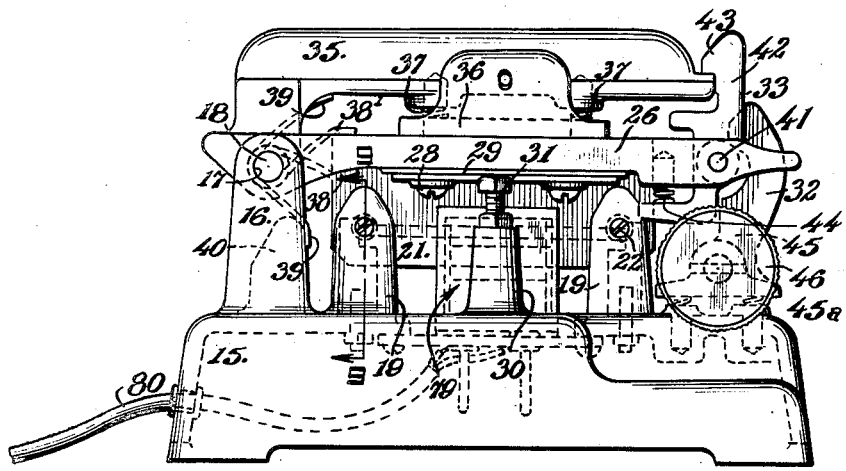
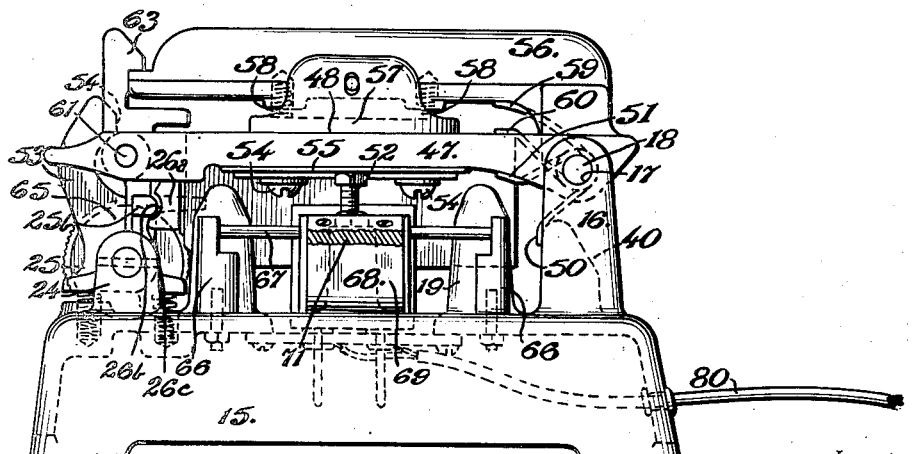
Inventor
Irving L. Merkur
By Clarence A. O'Brien
and Harvey B. Jacobson
Attorneys

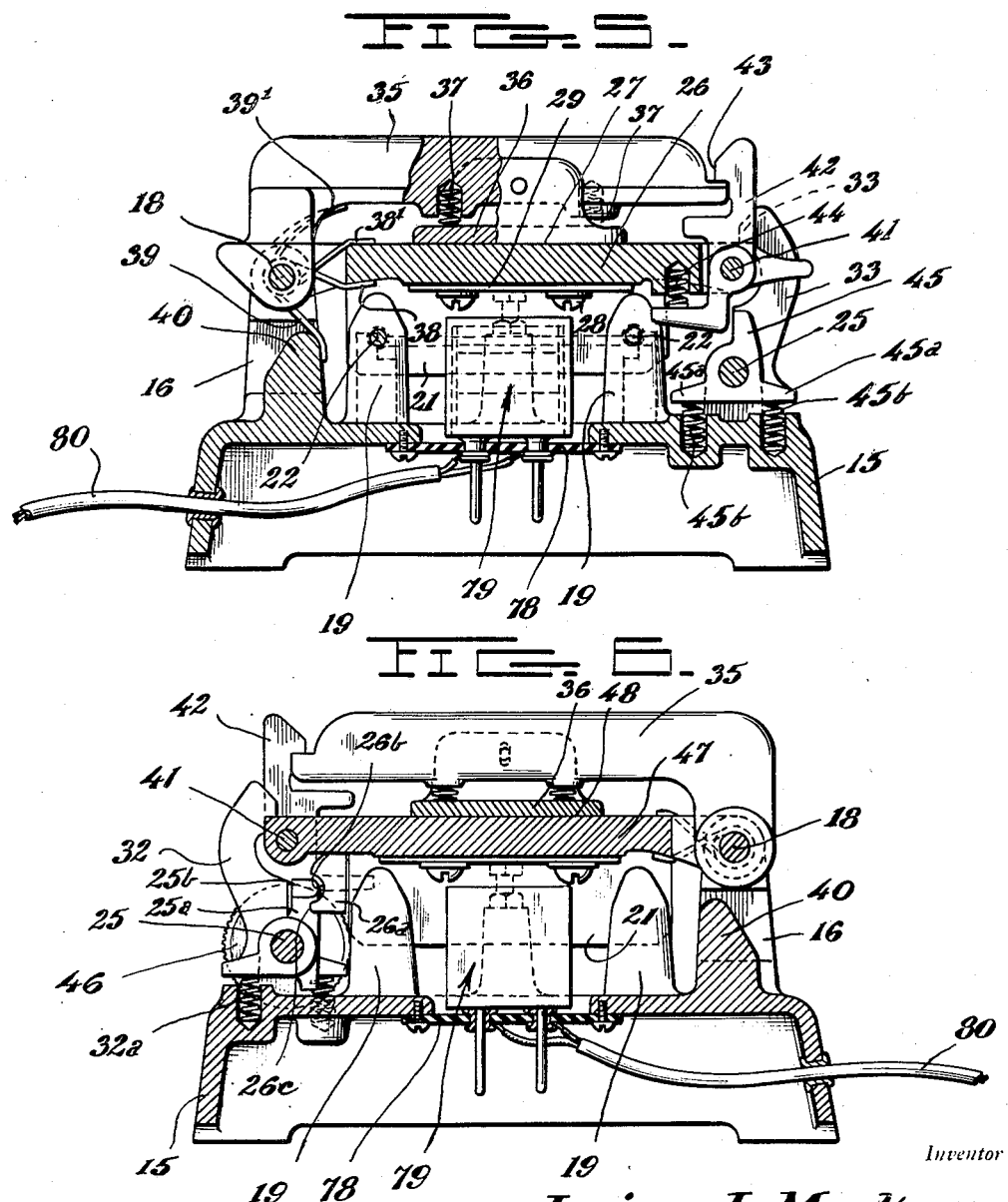

Oct. 31, 1950     I. I. MERKUR     2,527,952
FILM SPLICER
Filed July 25, 1946     4 Sheets-Sheet 4
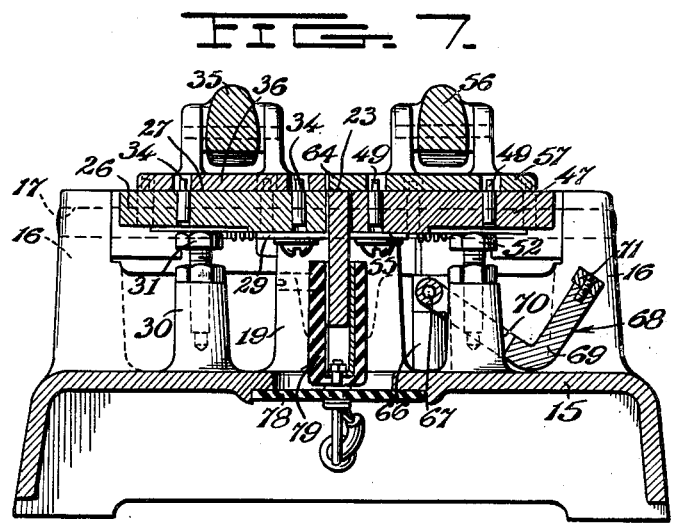
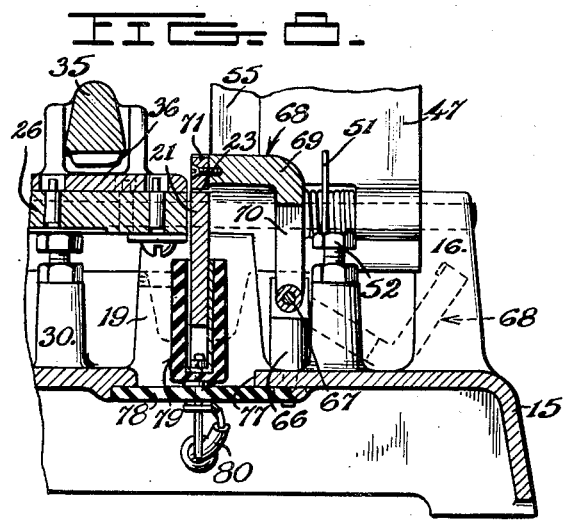
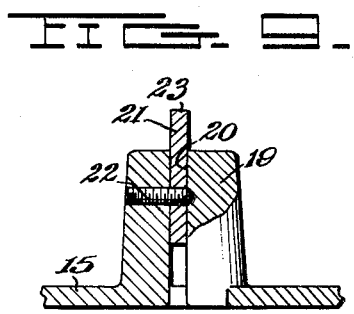
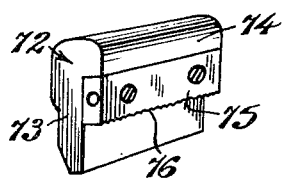
*Inventor*
*Irving I. Merkur*
By *Clarence A. O'Brien*
and *Harvey B. Jacobson*
*Attorneys*

Patented Oct. 31, 1950

2,527,952

UNITED STATES PATENT OFFICE 2,527,952

FILM SPLICER

Irving I. Merkur, New York, N. Y.

Application July 25, 1946, Serial No. 686,062

6 Claims. (Cl. 154—42.1)

This invention relates to a film splicer and constitutes an improvement over the film splicer disclosed in my application filed November 11, 1945, Serial No. 629,537 now abandoned.

The primary object of the invention is to facilitate the forming of an accurate junction between adjacent ends of a torn or broken film of the type employed in taking or projecting of motion pictures.

Another object is to accurately sever a broken or torn film so that the perforations adjacent the side edges of the film sections to be joined will match with perfect accuracy.

A further object is to minimize the number of movements required by the operator of the device in splicing a film and hence permit the film splicing operation to be accomplished with dispatch.

The above and other objects may be attained by employing this invention which embodies among its features a stationary blade, a film clamp pivotally mounted on each side of the blade, and a shear blade on the under side of each clamp for cooperation with the stationary blade in severing a length of film supported in an adjacent clamp.

Other features include guide pins carried by each clamp for locating a strip of film in proper position therein and a film scraper adapted to be moved into a position above the upper surface of the stationary blade for scraping the emulsion off of a portion of a film and a presser foot carried by one of the film clamps for cooperation with the stationary blade in holding adjacent ends of a film strip in overlapped relation.

Still other features include means normally urging the film clamps into open position, latches for holding the film clamps in closed position and means for simultaneously releasing the latches upon completion of the film splicing operation.

In the drawings:

Figure 1 is a top plan view of a film splicer embodying the features of this invention, Figure 2 is a front view in elevation thereof, Figure 3 is an end view taken from the left hand end of Figure 1, Figure 4 is an end view from the opposite end of the device, Figure 5 is a transverse sectional view taken substantially along the line 5—5 of Figure 2, Figure 6 is a transverse sectional view taken substantially along the line 6—6 of Figure 2, Figure 7 is a longitudinal sectional view taken substantially along the line 7—7 of Figure 1, Figure 8 is a fragmentary sectional view similar to Figure 7 but showing the film scraper in operative position with relation to the stationary blade, Figure 9 is a fragmentary sectional view through the blade and blade holder, and Figure 10 is a perspective view of a modified form of film scraper.

Referring to the drawings in detail my improved film splicer comprises a base 15 provided adjacent opposite ends with standards 16 formed with aligning openings 17 for the reception of a pivot shaft 18 upon which the film supporting levers and clamps to be more fully hereinafter described are pivotally supported. Extending upwardly from the upper surface of base 15 intermediate the ends thereof are lugs 19 provided with transversely extending aligning slots 20 for the reception of a stationary blade 21 (Fig. 9) which is held in proper position in the lugs 19 by means of suitable clamp screws 22. As illustrated in the drawings the top edge 23 of the blade 21 lies in a horizontal plane and serves as a supporting surface for a portion of a film during certain of the splicing operations as will be more fully hereinafter explained. Extending upwardly from the top surface of the base 15 in spaced parallel relation are lugs 24 provided with aligning bores the axes of which lie parallel with the axes of the openings 17, and rotatably supported in the bores of the lugs 24 is a rock shaft 25 the purpose of which will be more fully hereinafter explained.

Pivotally supported on the shaft 18 to the left side of the blade 21 when facing the film splicer is a lever 26 carrying on its upper face a pad 27 which when the lever is in lowered position lies in a plane with the upper edge 23 of the blade 21. Secured as by attaching screws 28 to the under side of the lever 26 is a shear blade 29, the edge of which is adapted to ride against the blade 21 with a shearing action for a purpose to be more fully hereinafter described. Mounted in a pedestal 30 which rises upwardly from the upper face of the base 15 is an adjusting screw 31 the head of which is adapted to engage the under side of the lever 26 in order that when the lever is moved to lowered position it may be made to accurately align with the top edge 23 of the blade 21. Mounted to rotate on the shaft 25 intermediate its ends is a spring pressed latch 32 carrying adjacent its upper end a latch dog 33 which is adapted to overlie the upper face of the forward end of the lever 26 when the latter is in lowered position in order releaseably to hold it against accidental movement. A compression spring 32a serves to urge the latch 32 into latching engagement with the lever 26. Threaded in the lever 26 and projecting upwardly through the pad 27 are spaced guide pins 34 which are adapted to project through the perforations in the side edges of a film in order properly to hold it in place on the pad. Pivotally supported on the shaft 18 is a clamp arm 35 which in clamped position lies in spaced parallel relation with the upper side of the lever 26, and supported intermediate the ends of the clamp arm 35 is a clamp plate 36 which when the clamp arm is in clamping position is yieldingly urged downwardly against the pad 27 under the influence of springs 37. A spring is coiled about the shaft 18 and is provided with oppositely extending legs 38 and 39 respectively with the arm 38 bearing against the lever 35 while the arm 39 bears against a stop rib 40 carried by the base 15 so that the lever 26 will be yieldingly urged into open position. A similar spring encircles the shaft 18 with its arms 38' and 39' bearing respectively on the lever 26 and the clamp arm 35 yieldingly to urge the clamp arm into open position. Pivotally supported as at 41 adjacent the forward end of the lever 26 is a latch 42 carrying a latch dog 43 which is yieldingly urged into engagement with the upper face of the clamp lever 35 under the influence of a compression spring 44. A cam arm 45 is secured to the shaft 25 and is adapted to engage the lower end of the latch 42 so that when the shaft 25 is rotated, in a counterclockwise direction when viewed from the left of Figure 1, the latch 42 will move into releasing position so as to permit the lever 26 to swing upwardly under the influence of the spring 38. The cam arm 45 is provided at its lower end with oppositely extending feet 45a the under sides of which are engaged by compression springs 45b so that the shaft 25 will automatically return to a neutral position after each operation. A peripherally knurled thumb wheel 46 is secured to the shaft 25 by means of which its movements in a clockwise or counterclockwise direction may be controlled.

Pivotally supported on the shaft 18 adjacent the right hand side of the blade 21 is a lever 47 which like the lever 26 is provided on its upper face with a clamp pad 48 which is adapted to lie in a plane with the upper surface 23 of the blade 21 and with the pad 27 previously described. Supported in the lever 47 and projecting upwardly through the upper surface of the pad 48 are guide pins 49 which are adapted to extend through the perforations adjacent the side edges of a strip of film in order accurately to locate the film on the pad 48. Encircling the shaft 18 is a coil spring having an arm 50 and an arm 51 which arms bear respectively against the stop 40 and the under side of the lever 47 so as to urge the lever into open position. An adjusting screw 52 is mounted in a pedestal carried by the base 15 which rises substantially midway between the opposite side edges and opposite ends of the lever 47 so that the pad or surface 48 may be accurately located with relation to the top edge 23 of the blade 21 when the lever is in lowered position against the tension of the spring just described. A latch arm 53 is rotatably mounted on the shaft 25 and carries adjacent its upper end a latch dog 54 which is adapted to overlie the upper forward edge of the lever 47 in order releasably to hold the lever in its lowered position with its upper face in a plane with the upper edge 23 of the blade 21. Formed on the lower end of the latch arm 53 is a laterally extending lug 53a which is engaged by a compression spring 53b adapted yieldingly to urge the latch dog 54 into engagement with the end of the lever 47 opposite that pivoted to the shaft 18. Secured to the under side of the lever 47 as by attaching screws 54 is a shear blade 55 which like the blade 29 cooperates with the upper edge 23 of the blade 21 in shearing a film strip.

Mounted for pivotal movement about the shaft 18 is a clamp arm 56 which when in its lowered position lies in spaced parallel relation to the lever 47, and supported intermediate the ends of the clamp arm 56 is a clamp plate 57 which is yieldingly held downwardly in contact with the pad 48 under the influence of compression springs 58. Encircling the shaft 18 is a coil spring having laterally extending arms 59 and 60 which bear respectively against the underside of the clamp arm 56 and on the upper side of the lever 47, so that the clamp arm 56 will be yieldingly urged to swing about the pivot 18 away from parallel relation with the lever 47. Pivotally supported at 61 adjacent the forward free end of the lever 47 is a latch 62 carrying a latch dog 63 which is adapted to overlie the upper side of the clamp arm 56 when the latter is in film clamping position in order releaseably to hold the arm 56 against movement under the influence of the spring arm 59. As illustrated in Figures 2 and 7 the clamp plate 57 is provided with a presser foot 64 which when the clamp arm 56 is in lowered position overlies the upper edge 23 of the blade 21 for a purpose to be more fully hereinafter explained. Secured to the shaft 25 is a cam 65 which is adapted to bear against the lower portion of the latch 62 so that when the shaft 25 is rotated in a counterclockwise direction when viewed from the left side of Figure 1, the latch 62 will be moved to clamp arm releasing position.

Supported on upwardly extending spaced parallel studs 66 carried by the base 15 beneath the path of movement of the lever 47 is a transversely extending guide bar 67 which is circular in cross section in order pivotally and slidably to support a film scraper designated generally 68. This scraper comprises a substantially L-shaped body 69 provided with spaced parallel legs 70 which are pierced to receive the guide bar 67 in order that the scraper may be pivotally and slidably supported thereon. As shown in the drawings the legs 70 extend substantially perpendicular to the main body portion of the L-shaped body 69 so that when the scraper is swung upwardly to operative position the end of the body portion will overlie the upper face 23 of the blade 21. A hardened serrated scraper blade 71 is secured to the body 69 in such a manner that the teeth thereof will engage the surface of a portion of film which overlies the edge 23 of the blade 21 so that by moving the scraper 68 longitudinally of the guide shaft 67 the serrations in the blade 71 will scrape any emulsion from the surface of a portion of film lying thereunder. In some instances I may find it advantageous to omit the scraper just described and substitute therefor a scraper designated generally 72 (Figure 10) which comprises a body 73 having an overhanging flange 74 beneath which a hardened scraper blade 75 is supported with its serrated edge 76 disposed downwardly for contact with a portion of film lying on the edge 23 of the blade 21.

In some instances in order to speed up the film splicing operation I find it advantageous to employ heating means for the blade 21 in which event the base 15 is provided directly below the blade with a transverse slot 77 in which is supported in any suitable manner a plate 78 of insulating material. This plate carries a suitable transversely U-shaped electric heater 79, opposite legs of which contain heating coils and are adapted to embrace the lower half of the blade 21 so that when the heater is set into operation, the heat generated thereby will be absorbed by the blade. The heater 79 is preferably connected through the medium of a conventional cable 80 to any suitable source of electric power by means of which the heater may be energized.

Depending from the under side of the lever 26 near its free end is a lug 26a formed intermediate its ends with a notch or recess 26b forming a cam face 26c the purpose of which will hereinafter appear. Secured to the rock shaft 25 is an upstanding lever arm 25a carrying at its upper end a cross arm 25b which extends transversely across the inner sides of both latch arms 32 and 53 so that when the knob 46 is rotated in a clockwise direction, when viewed from the left hand side of the device, both latch arms will be moved to released position. The rear or inner face of the cross arm is adapted when the lever 26 is in lowered position to rest in the notch 26b, and when the lever 26 is moved about the shaft 18, to be engaged by the cam 26c so as to cause the latches 32 and 53 to move to plate releasing position against the urge of their respective springs. In this manner the lever 47 automatically will be released to swing upwardly as the lever 26 is lowered and latched.

In use a film section to be spliced is first clamped between the clamp plate 57 and the pad 48, with the lever 26 and its attendant clamp mechanism elevated, it being understood that the lever 47 is first latched downwardly with the upper face of the pad 48 in a plane with the face 23 of the blade 21 and the portion of the film which is to be severed extending to the left beyond the upper edge of the blade 23. Upon swinging the blade 26 about the shaft 18 in a downward direction it will be obvious that the shear blade 29 in cooperation with the blade 21 will shear off the portion of the film which extends to the left beyond the edge 23 of the blade 21. As the downward movement of the lever 26 approaches completion the cam 26c engages the cross arm 25b thus rocking the latch arms 32 and 53 to open position. The latch 53 thus released will permit the lever 47 to swing upwardly under the influence of the spring arm 51. This movement will carry the strip of film first cut upwardly and rearwardly out of the way. The latch 42 next is moved to release the clamp arm 35 so as to permit an adjacent film section to be located by the pins 34 on the pad 27. The clamp arm 35 is then moved downwardly and latched into place thus causing the pad 36 yieldingly to press against the film and clamp it firmly against the pad 27 after which the lever 47 is moved downwardly about its pivot so as to cause the blade 55 carried thereby to cooperate with the blade 21, and shear that portion of the film which extends to the right beyond the upper face of the blade 21. It is preferred that the movement of the lever 47 be of an extent only sufficient to shear the film so that it will return under the influence of the spring arm 61 to its original position and thus clear the way for the scraper 68 to be swung about its guide rod 67 so as to rest upon the portion of the film which overlies the upper edge 23 of the blade 21. Movement of the scraper longitudinally of the rod 67 with pressure exerted on the top of the scraper will cause the emulsion on the surface of the film to be removed whereupon cement may be applied to the scraped surface. The lever 47 is next lowered so as to bring the film section carried thereby into contact with the portion of the film lying on the blade and to which the cement has been applied. Latching the lever 47 in its lowered position causes the foot 64 firmly to clamp film sections together until such time as the cement has been set. In order to speed the rapidity of the setting of the cement the heater 79 may be energized so as to heat the blade 21 and speed the rapidity of the volatilization of the volatile constituents of the cement.

Should it be so desired the scraper 68 may be omitted from the machine, and a hand scraper 72 (Figure 10) employed to remove the emulsion from that portion of the film which overlies the upper edge 23 of the blade 21.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. In a film splicer a base, a stationary blade carried by the base having its cutting edge disposed upwardly, a pair of levers pivoted to rotate about a common axis adjacent one end of the blade, a shear blade carried by each lever for cooperation with the stationary blade in severing a film, a clamp pad yieldingly supported on each lever for clamping a strip of film against the upper face of its respective lever, yielding means engaging each lever to urge its respective lever upwardly from its position adjacent the stationary blade and latches for holding the levers in lowered position against the effort of the yielding means with their upper faces in a plane with the upper edge of the stationary blade.

2. In a film splicer a base, a stationary blade carried by the base having its cutting edge disposed upwardly, a pair of levers pivoted to rotate about a common axis adjacent one end of the blade, a shear blade carried by each lever for cooperation with the stationary blade in severing a film, a clamp pad yieldingly supported on each lever for clamping a strip of film against the upper face of its respective lever, means to urge the clamp pads into open position, a manually released latch carried by each lever to hold its respective clamp plate in film clamping position means yieldingly to urge the levers upwardly away from the stationary blade, a manually released latch carried by the base to hold each lever downwardly against the effort of the yielding means and means selectively to release one or the other group of latches.

3. A film splicer which includes a base, a vertically disposed stationary ledger blade carried by the base, a pair of spaced parallel levers pivoted adjacent one end of the blade to swing about a common axis which lies perpendicular to the blade, said levers when lowered lying flush with the top edge of the blade, a shear blade carried by each lever for cooperation with the ledger blade in severing a film, a clamp arm mounted to swing about the common axis above each lever, a clamp plate yieldingly supported on each clamp lever for clamping a strip of film against the top face of each lever, a tortion spring encircling the common axis beneath each clamp arm yieldingly to urge its respective clamp arm upwardly and away from its respective lever, and a latch carried by each lever adjacent its end remote from its pivoted end for engaging its respective clamp arm and holding it against movement under the influence of its respective tortion spring.

4. A film splicer which includes a base, a vertically disposed stationary ledger blade carried by the base, a pair of spaced parallel levers pivoted adjacent one end of the blade to swing about a common axis which lies perpendicular to the blade, said levers when lowered lying flush with the top edge of the blade, a shear blade carried by each lever for cooperation with the ledger blade in severing a film, a clamp arm mounted to swing about the common axis above each lever, a clamp plate yieldingly supported on each clamp lever for clamping a strip of film against the top face of each lever, a tortion spring encircling the common axis beneath each lever yieldingly to urge its respective lever to swing upwardly and away from the stationary ledger blade and a latch pivotally supported adjacent the end of each lever remote from the common axis for holding the levers in lowered position against the effort of their respective tortion springs.

5. A film splicer which includes a base, a vertically disposed stationary ledger blade carried by the base, a pair of spaced parallel levers pivoted adjacent one end of the blade to swing about a common axis which lies perpendicular to the blade, said levers when lowered lying flush with the top edge of the blade, a shear blade carried by each lever for cooperation with the ledger blade in severing a film, a clamp arm mounted to swing about the common axis above each lever, a clamp plate yieldingly supported on each clamp lever for clamping a strip of film against the top face of each lever, a tortion spring encircling the common axis beneath each clamp arm yieldingly to urge its respective clamp arm upwardly and away from its respective lever, a latch carried by each lever adjacent its end remote from its pivoted end for engaging its respective clamp arm and holding it against movement under the influence of its respective tortion spring, a tortion spring encircling the common axis beneath each lever yieldingly to urge its respective lever upwardly and away from the blade, and a latch pivotally supported on the base adjacent the end of each lever remote from the common axis for holding its respective lever in lowered position against the effort of its respective tortion spring.

6. A film splicer which includes a base, a vertically disposed stationary ledger blade carried by the base, a pair of spaced parallel levers pivoted adjacent one end of the plate to swing about a common axis which lies perpendicular to the blade, said levers when lowered lying flush with the top edge of the blade, a shear blade carried by each lever for cooperation with the ledger blade in severing a film, a clamp arm mounted to swing about the common axis above each lever, a clamp plate yieldingly supported on each clamp arm for clamping a strip of film against the top face of each lever, a tortion spring encircling the common axis beneath each clamp arm yieldingly to urge its respective clamp arm upwardly and away from its respective lever, a latch carried by each lever adjacent its end remote from its pivoted end for engaging its respective clamp arm and holding it against movement under the influence of its respective tortion spring, a tortion spring encircling the common axis beneath each lever yieldingly to urge its respective lever upwardly and away from the blade, a latch pivotally supported on the base adjacent the end of each lever remote from the common axis for holding its respective lever in lowered position against the effort of its respective tortion spring, a rockable means mounted to rock about an axis which lies parallel to the common axis adjacent the end of the blade remote from the common axis and means carried by the rockable means selectively to release the latches according to the direction of rotation of the rockable means.

IRVING I. MERKUR.

REFERENCES CITED

The following references are of record in the file of this patent:

UNITED STATES PATENTS

| Number | Name | Date |
|---|---|---|
| 1,781,200 | Spiros | Nov. 11, 1930 |
| 1,972,133 | Darrow | Sept. 4, 1934 |
| 2,250,194 | Gavin | July 22, 1941 |
| 2,300,888 | Griswold | Nov. 3, 1942 |
| 2,394,317 | Matson | Feb. 5, 1946 |
| 2,457,995 | Frankel | Jan. 4, 1949 |